United States Patent [19]

Beard

[11] 4,441,635
[45] Apr. 10, 1984

[54] DIRECT HIGH FLOW AEROSOL-TYPE VALVE WITH MOVEABLE CUP

[76] Inventor: Walter C. Beard, South St., Middlebury, Conn. 06762

[21] Appl. No.: 438,212

[22] Filed: Nov. 1, 1982

[51] Int. Cl.³ .............................................. B65D 83/14
[52] U.S. Cl. ............................ 222/402.22; 222/402.21
[58] Field of Search ...................... 222/402.21, 402.22, 222/402.23, 402.24; 251/349

[56] References Cited

U.S. PATENT DOCUMENTS

| | | |
|---|---|---|
| 2,487,434 | 11/1949 | Geiss et al. |
| 2,660,132 | 11/1953 | Pyenson |
| 2,667,991 | 2/1954 | Boyer |
| 2,709,111 | 5/1955 | Green |
| 2,729,368 | 1/1956 | Lapin et al. |
| 2,731,298 | 1/1956 | Green |
| 2,739,841 | 3/1956 | Soffer |
| 2,953,284 | 9/1960 | Prussin et al. |
| 3,060,965 | 10/1962 | Taggart |
| 3,216,463 | 11/1965 | Kibbel, Jr. et al. |
| 3,255,936 | 6/1966 | Healy et al. |
| 3,547,405 | 12/1970 | Ewald |
| 3,581,941 | 6/1977 | Bruce et al. |
| 3,635,379 | 1/1972 | Angele |
| 3,830,760 | 8/1974 | Bengtson |
| 4,171,757 | 10/1979 | Diamond |

FOREIGN PATENT DOCUMENTS 2014248  8/1979  United Kingdom .......... 222/402.22

OTHER PUBLICATIONS

Three pages, unnumbered and undated from a catalogue issued by Clayton Corp., 4205 Forrest Park Blvd., St. Louis, MO 63108.
Reprint of article by Walter C. Beard from Aerosol Age Apr., May 1966, entitled "Aerosol Valves Up-to-Date".
Reprint of article by Walter C. Beard from Aerosol Age entitled, "The Beard Universal Seal-Tip Valve", Apr. 1972.

Primary Examiner—Joseph J. Rolla
Assistant Examiner—Thomas C. Fitzgerald
Attorney, Agent, or Firm—Hill, Van Santen, Steadman & Simpson

[57] ABSTRACT

A fluid dispensing valve structure for dispensing the viscous contents of a pressurized container. The structure incorporates a tiltable elongated tubular nozzle which, when tilted, longitudinally moves a moveable cup member in a valve chamber, away from a seal, thereby opening the valve. Fluid from the container passes transversely through a side opening in the valve chamber over a top region of the moveable cup member and into the nozzle during dispensing.

10 Claims, 5 Drawing Figures

U.S. Patent   Apr. 10, 1984   4,441,635
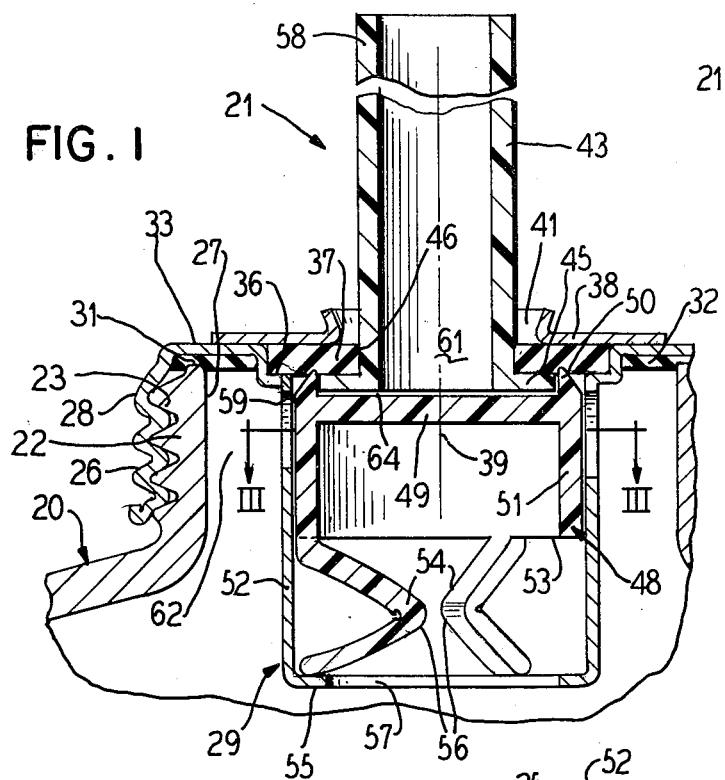
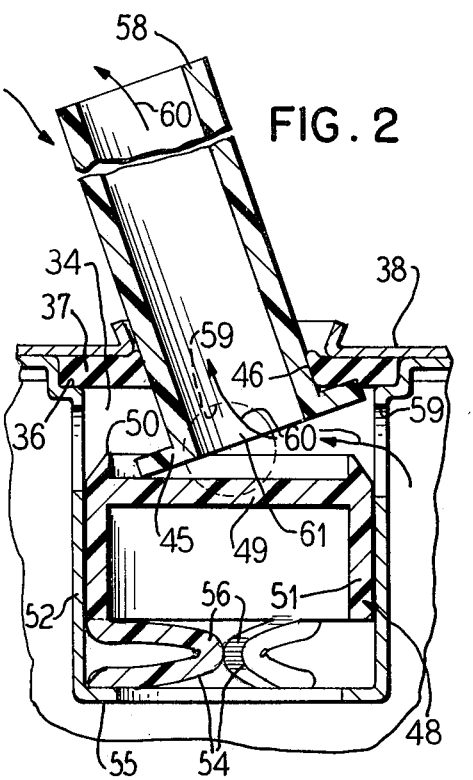
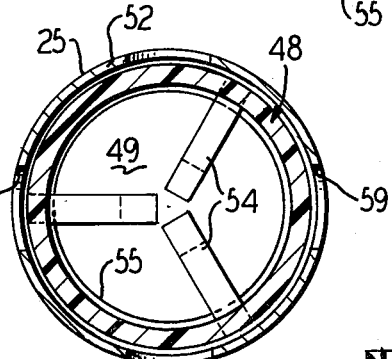
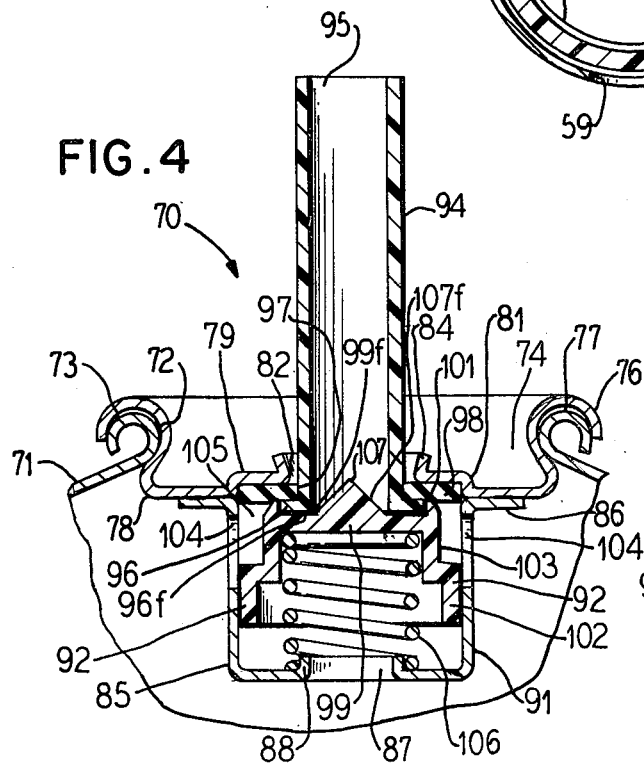
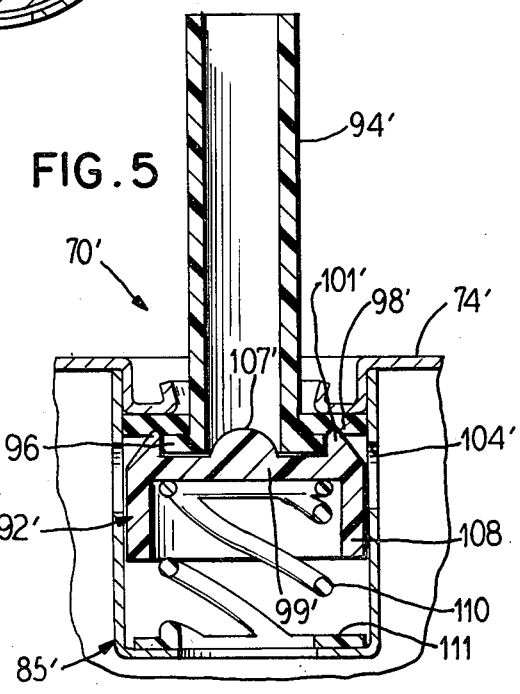

DIRECT HIGH FLOW AEROSOL-TYPE VALVE WITH MOVEABLE CUP

BACKGROUND OF THE INVENTION

1. Field of the Invention

This invention lies in the field of tiltable valves for pressurized containers, especially valves adapted for dispensing viscous fluids, and also to improved mounting cup members and improved moveable cup members for such valves.

2. Description of the Prior Art

In the art of aerosol valves, it has heretofore been appreciated that tiltable valve assemblies can employ among their components a moveable cup member (see, for example, Ewald U.S. Pat. No. 3,547,405). Characteristically, in such prior art aerosol valve assemblies, such a moveable cup member has served as a means for introducing turbulent type flow into the fluid stream being dispensed which is desirable in order to produce a homogenous aerosol comprised of material being dispensed in admixture with the pressurizing propellant in a vapor phase.

When, however, it is desired to dispense a highly viscous fluid, a completely different type of fluid flow through such a valve structure during dispensing is desired and is even necessary for operability reasons. For a viscous liquid, fluid flow through such a valve structure should be laminar in type and not turbulent.

In turbulent flow, it is typical in the art to utilize small clearance passages particularly in the region of the moveable cup member which then feed into a relatively larger passageway out of which the aerosol is finally vented. When a tiltable valve structure containing such small passageways in the region of the moveable cup is used for an attempt to dispense a viscous fluid, it is discovered that severe problems exist owing to the difficulty of passing a viscous liquid through such narrow passageways. As a practical matter, it is found that narrow passageways in the region of the moveable cup member produce a generally inoperative valve structure for the dispensing of highly viscous fluids.

In order to provide a valve assembly for use with an aerosol-type dispensing container from which a viscous liquid is to be dispensed, it is desirable, then, to have cross-sectionally very large and longitudinally very short passageways through which such a viscous liquid must pass to be dispensed.

Previously, I have invented certain improved tiltable valve structures and components therefor which are adapted for dispensing viscous fluids; see U.S. patent applications Ser. Nos. 405,696, filed Aug. 5, 1982; 405,685, filed Aug. 5, 1982, 394,517, filed July 2, 1982; and 432,298, filed Oct. 1, 1982. In these valve structures, as well as in Ewald '405, fluid to be dispensed moves through or alongside of side wall portions of the moveable cup member incorporated into each individual valve structure.

To afford the possibility of shortening such a longitudinal (with respect to the direction of moveable cup reciprocal movements) fluid flow and to provide a minimal fluid flow pathway through the interior of a tiltable valve structure, I have now invented an improved tiltable valve structure especially adapted for the dispensing of viscous fluids wherein fluid to be dispensed travels generally transversely (with respect to the direction of reciprocal moveable cup movement) through the valve structure. So far as I am presently aware, no one has heretofor produced a valve structure of this type.

BRIEF SUMMARY OF THE INVENTION

This invention is directed to a new and improved tiltable valve assembly adapted for the dispensing of highly viscous fluids from pressurized containers wherein the valve assembly incorporates a mounting cup member and a moveable valve cup member which so cooperate and interrelate to one another that when the valve is opened, flow of material being dispensed through the valve occurs in a substantially transverse direction thereby bypassing longitudinal flow of such material through portions of the moveable valve up member structure such as is accomplished in the prior art.

Such a valve assembly can be manufactured in an assembled configuration, subsequently stored, and then assembled as a unit onto a desired pressurizable container without further valve assembly modification.

The present invention is also directed to a tiltable valve assembly of the type incorporating a moveable cup member and a mounting cup member. A high flow capability for highly viscous fluids through the valve assembly exists yet there is a positive sealing action between moveable cup member and a gasket means retained by the mounting cup member when the valve assembly is in a closed configuration. When the valve is an open configuration, aperture means defined in side wall portions of the mounting cup member permit radial passage of viscous fluids across the top of the moveable valve cup member directly into a centrally or axially located tubular nozzle means.

The moveable cup member optionally can include a camming member which permits the development of a maximum sized aperture between the moveable cup member and such gasket means through the tilting of the tubular nozzle means, the interior end portion of such tubular means being adapted for engagement with such camming member during a valve opening operation.

The present invention is further directed to an improved dispensing device for dispensing highly viscous fluids which utilizes in combination a pressurizable container and a tiltable valve assembly of the type herein provided.

More specifically, the present invention concerns an improved tiltable valve assembly which includes a mounting cup member sealingly securable to a pressurizable container and having generally continuous side wall portions locatable interiorly of such container. Carried within such mounting cup member is a resilient seal member. An elongated tubular nozzle means is provided having a dispensing orifice in one end thereof and having a second end generally opposed to said one end extending through said mounting cup member. Such tubular nozzle means is supported in said mounting cup member by such resilient seal member in a normally generally straight upright extended position.

A moveable valve cup member is reciprocally slideably carried within such mounting cup member and is normally biasable against said resilient seal member to form a seal means for normally sealing the contents of an associated pressurizable container. Such moveable valve cup member is engageable with such second end of such tubular nozzle means and the contents of such pressurized container are dispensable when the one end of such tubular nozzle means is tiltably displaced relative to its generally straight upright extended configuration by an external deflecting operating force applied there against, thereby opening such seal means. The moveable valve cup member includes a base portion extending across said second end of said tubular nozzle means, rib means upstanding from said base portion for engaging said resilient seal member peripherally of said tubular nozzle means, and guidance means for orienting said moveable valve cup member relative to said mounting cup member for stable reciprocal movements longitudinally relative to said mounting cup member.

Aperture means is defined in such side wall portions of said mounting cup member axially adjacent said seal member. When said moveable valve cup member is displaced by tilting of the elongated tubular nozzle means, a passageway is provided for movement of fluid through such aperture means, radially across said base portion, and into said tubular nozzle means.

The interrelationship between the moveable valve cup member, the tubular nozzle means, the resilient seal member, and the mounting cup member is such that a substantially unobstructed flow of contents from the interior of a container fitted with such valve structure can occur in such valve structure in a direction substantially transversely and radially relative to the longitudinal axis of the valve structure when such one end of said elongated tubular nozzle means is so tiltably displaced thereby bypassing longitudinal flow of container contents through portions of said moveable valve cup member.

Various other advantages, features, objects, aims, purposes, and the like will be apparent to those skilled in the art from the accompanying specification and drawings.

BRIEF DESCRIPTION OF DRAWINGS

In the drawings:

FIG. 1 is fragmentary vertical sectional view taken through one embodiment of a pressurized-fluid dispensing valve of the present invention shown in functional association with a pressurizable container;

FIG. 2 is a view similar to FIG. 1, but illustrating the valve structure in an open or dispensing condition;

FIG. 3 is a transverse sectional view taken along the line 33 III—III of FIG. 1;

FIG. 4 is a view somewhat similar to FIG. 1, but showing an alternative embodiment of a valve structure of the present invention; and FIG. 5 is a view somewhat similar to FIG. 1, but showing a further alternative embodiment of a valve structure of the present invention.

DETAILED DESCRIPTION

Referring to FIG. 1-3, a dispensing container or can 20, shown fragmentarily, is fitted on its top end with a tiltable valve structure 21 of the present invention. Container 20 is provided with an axially located aperture 27 having a suitable neck 22, the neck 22 here having threads 23 formed on circumferential portions adjacent the lip 31 thereof. In the present embodiment, the container 20 is conveniently formed of sheet metal, plastic, or the like.

The container 20 can be of any conventional structure which is capable of delivering or supplying to the neck region 22 a pressurized fluid. Examples of suitable fluids include viscous liquids, aerosols, gasses, and the like. The container structure and the means for pressurizing employed with an individual container can be conventional and do not as such constitute any part of the present invention.

The tilt valve structure 21 includes a metallic mounting cup 29 which terminates in a circumferentially located outer integral complementary downturned (relative to cup 29) rim flange 28 which is provided with threads 26 adapted to make a mating engagement with the threads 23 of the neck 22. For purposes of permitting a sealing engagement to be achieved between the cup 29 and the lip 31 of neck 22, a sealing ring 32 of a resilient elastomeric plastic material is provided, the ring 32 being adapted for seating in the rollover region 33 of the flange 28. The sealing ring 32 can be comprised of a chloroprene rubber composition, or the like, as desired, so that a sealing engagement can be achieved between the ring 32 and the lip 31 when the cup 29 is installed on the neck 22.

Circumferentially about the mouth 34 of the mounting cup 29, there is provided a seat 36 integrally formed therein which is adapted for receiving thereinto edge portions of a gasket 37 comprised of a resilient elastomeric material, such as a chloroprene rubber composition, or the like. A cover plate 38 is mounted across mouth 34 so as to retain the gasket 37 and other components housed in the cup 29 in an assembled configuration after their assembly. The plate 38 has a circumferentially outer flanged area adapted to make face to face contact with a portion of the rollover region 33 and is bonded thereto by any conventional means, such as welding, adhesive, or the like, as desired. Through the center portion and along the axis 39 of the mounting cup 29, an aperture 41 is formed in the plate 38 which can be optionally provided, as in assembly 21, with an upstanding lip 42 which serves a stiffening or reinforcing means about the aperture 41.

Through the aperture 41, during assembly of the valve structure 21, is extended a nozzle stem member 43 which, at its upper end portion, is provided with a dispensing orifice 44 and which, at its opposite end portion, is provided with a radially outwardly extending flange 45 that is here integrally formed with the nozzle stem member 43. The nozzle stem member 43 extends also through the central aperture 46 of the gasket 37 which gasket 37, as shown, also makes abutting contact with both adjacent outer wall portions of the nozzle stem member 43 and its flange 45. The nozzle stem member 43 is in a normally upright configuration as illustrated in FIG. 1.

A moveable cup member 48 is disposed within cup 29 for axial sliding movements therewithin. The moveable cup member 48 includes an end plate 49 which transversely (relative to nozzle stem member 43) extends across flange 45 and further includes, adjacent the outer periphery of end plate 49, an integrally formed associated upstanding rib portion 50 which annularly extends about the end plate 49. The rib portion 50, when the valve structure 21 is in its closed configuration as shown in FIG. 1, makes a seating engagement with adjacent portions of the gasket 37.

Also, integrally associated with the end plate 50 is a circumferentially located sleeve portion 51 which is so configured so as to be in a spaced radially adjacent, or even optionally contacting slidable, relationship with adjacent wall portions of the cup 29. The axial length of the sleeve portion 51 is preferably constructed, as shown, to provide a stable guiding relationship between the tubularly configured side walls 52 of cup 29.

The terminal region 53 of sleeve portion 51 is here provided with a plurality of grasshopper-type integrally formed spring arms 54 (here three in number) which provide an optional feature for the valve structure 21. The function of the spring arms 54 is to bias the cup member 48 (and its rib portions 50) into a normally closed configuration with the rib portion 50 being seated and sealingly engaged with the sealing gasket 37. An in-turned bottom flange 55 is provided for the terminal region of the tubular side walls 52 of cup 29 thereby providing a shelf for receiving the respective terminal ends of each spring arm 54. The spring arms 54 are each provided with a knee 56 which flexes as the moveable cup 48 reciprocates. The spring arms 54 aid in returning the moveable cup 48 to the seating configuration indicated at the end of a pressurized fluid dispensing operation. Alternatively, if the valve structure 21 does not employ the spring arms 54, the internal pressure within the container 20 itself exerted through aperture 57 in cup 29 can be used as the biasing means for returning and maintaining the cup member 48 and rib portion 50 in a sealed or closed engagement relative to the gasket 37. Any convenient spring biasing arrangement can be employed, as desired, for a given valve structure of the present invention, as those skilled in the art will appreciate.

When an external deflecting force is applied against the outer or tip end 58 of the nozzle stem member 43, the flange 45 is moved against the end plate 48, thereby causing the moveable cup member 48 to slidably move towards the flange 55 resulting in the unseating and separating the rib portion 50 relative to the gasket 37, thus opening the valve structure 21. In the open configuration, the pressurized contents in the container 20 flow into the interior region of neck 22 and through aperture 59 formed in side wall 52, the apertures 59 being adjacent the set 36, and hence into the nozzle stem member 43 past the flange 45 and the rib portion 50, all as indicated by the arrows 60 shown in FIG. 2.

As those skilled in the art will appreciate, the valve structure 21 in its open configuration provides a cross-sectionally exceedingly large flow pathway through the valve structure when the valve structure is in the open configuration shown for example in FIG. 2. In addition, the valve structure 21 provides an exceedingly short flow pathway particularly in the region between apertures 59 and the receiving mouth 61 in the region of flange 45. Thus, a direct pathway is provided for fluid being dispensed from the interior from container 20 through the valve structure 21 into the nozzle stem member 43. The axial movement adjacent portions of a moveable cup member associated with fluid passage through prior art moveable cup type tiltable valve structures is thus completely avoided by the present invention. In addition, the moveable cup member 48 in cooperation with the cup structure 29 provides a maximum diameter for the rib portion 50, thereby enhancing the sealability of the rib portion 50 in relation to gasket 37.

When valve closure is desired, the tip end 60 is allowed to return to its normally upright configuration which effects a reversal of the valve opening operations described above and results in a resealing between the rib portion 50 and the gasket 37, with resealing being effectuated, in the embodiment shown, both by the interior pressure being maintained within the container 20 and by the yielding bias afforded by spring arms 54.

While in the valve structure 21, the plate 38 is illustrated to be in a separate overlapping but securable interrelationship with respect to the cup 29, those skilled in the art will appreciate that various structural relationships can be provided for the plate 38 in relation to, for example, the tubular side walls 52 and the peripheral terminal outer wall regions of a cup 29. The spacing 62 existing between the neck 22 and the tubular side walls 52 can be varied as desired, as those skilled in the art will likewise appreciate. In order to provide an optimized relationship between apertures 59 and the maximum opening obtainable between flange 45 and rib portion 50, the apertures 59 may be carefully sized and located with respect to the tubular side walls 52, as those skilled in the art will appreciate.

Preferably, and as shown, the moveable cup member 48 is provided with pocket 64 across the upper face of the end plate 49 transversely between the rib portion 50 and vertically between the flange 45 and end plate 49. In this pocket, the inner end portion of nozzle stem member 43 along with flange 45 is receivable so that such structure is an adjacent but preferably noncontacting relationship with respect to the end plate 50 when the valve structure 21 is in its closed configuration as shown in FIG. 1. In this way, the rib portion 50 can be allowed to be received into a sealing engagement with gasket 37 without interference with the stem member 43.

Referring now to FIG. 4, there is seen an alternative embodiment of a tiltable valve structure of the present invention, such structure being identified in its entirety by the numeral 70. Valve structure 70 is particularly well adapted for combination with an aerosol-type conventional dispensing container 71 which is provided with an axially located aperture 72 having a rolled perimeter 73, the container 71 being formed preferably in this instance of sheet metal.

The tilt valve structure 70 includes a metallic mounting plate 74 which terminates in a rolled perimeter 76 that is adapted to make nesting engagement with the roller perimeter 73. Interior surfaces of the rolled perimeter 76 are provided with a coating 77 formed of a sealing material comprised of a resilient elastomeric plastic composition, such as chloroprene rubber or the like, so that, when the mounting plate 74 is fitted over the rolled perimeter 73 and crimped thereto by collet fingers, there is produced a retaining crimp 78 in plate 74 and the preformed valve structure 70 is thus sealingly associated with the container 71.

The central portion of the mounting plate 74 is provided with an integrally formed cover plate region 79 which includes a raised rim 81 and a centrally defined aperture 82 which has circumferentially defined an upwardly and outwardly formed rigidifying flange 84. Depending from the mounting plate 74 in aligned relationship to the cover plate region 79 is a cross sectionally tubularly shaped cup member 85 that is provided with an out-turned rim flange 86 which is secured in face to face engagement with the interior or bottom face of the plate 74 by means of welding, adhesive, or the like, as desired. The internal central bottom face of the cup member 85 is provided with an aperture 87 equipped with an in-turned rim flange 88.

Disposed for axial sliding movements within the tubular side wall portions 91 of the cup member 85 is a moveable cup member 92. Through the aperture 82 of the plate region 79 is extended a nozzle stem member 94 which at its upper end portion is provided with a dispensing orifice 95 and which at its opposite end portion is provided with a radially outwardly extending flange 96 that is here integrally formed with the nozzle stem member 94. The nozzle stem member 94 extends also through a central aperture 97 of a resilient elastomeric gasket 98 which gasket 98 also makes abutting contact with both adjacent outer wall portions of nozzle stem member 94 and the flange 96. The outer perimeter of the gasket 98 is seated in the central portion of the mounting cup 85. The nozzle stem member 94 is in a normally upright configuration as illustrated in FIG. 4.

The moveable cup member 92 includes a base plate 99 which transversely (relative to nozzle stem member 94) extends across the flange 96 and further includes, adjacent the outer periphery of the base plate 99, an integrally formed upstanding rib portion 101 which annularly extends about the base plate 99. The rib portion 101, when the valve structure 70 is in its closed configuration as shown in FIG. 4, makes a seating engagement with adjacent portions of the gasket 98.

Also, the moveable cup member 92 is provided with a circumferentially extended skirt portion 102 which is adapted to make slidable guiding contact with the tubular wall portions 91, the axial length of the skirt 102 being sufficient to provide a stabilized reciprocal sliding ability for the moveable cup 92 relative to the cup 85. The upper regions of the skirt 102 are integrally associated with the circumferentially outer portions of the plate 99 by means of an interconnecting sleeve 103 integrally formed therewith. The exterior diameter of the sleeve 103 is smaller than the exterior diameter of the skirt portion 102. The sleeve 103 thus provides an annularly disposed chamber about the outside region thereof which is located within the cup 85 in the region of apertures 104 defined in the cup 85 near the mouth 105 thereof. Thus, a pressurized fill within a container 71 is in close proximity to the rib portion 101 and a minimum flow pathway exists between the rib portion 101 and the port formed between the flange 96 and the rim portion 101 when the nozzle stem member 94 is in its tilted (valve open) configuration.

In order to enhance valve closing capabilities following a valve opening, a coil spring member 106 of the compression type is disposed within the moveable cup member 92 so that one end thereof butts the plate 99 while the other end thereof is retained adjacent the rim flange 88.

As an optional but preferred feature, the plate 99 is provided with a centrally located camming member 107 which is preferably integrally formed therewith. Thus, the plate 99 has a flat annular face 99f positioned peripherally about the camming member 107, such face 99f being adapted to extend generally parallel to the face 96f of flange 96. Observe that the face 96f, when the valve 70 is in its closed configuration shown in FIG. 4, is preferably in a spaced relationship to the face 99f. The face 107f of camming member 107 is inclined relative to the face 99f, the angle of inclination relative to face 107f being generally greater than 0° and smaller than about 70° with a presently preferred such angle falling in the range from about 30° to 60°. This camming angle of inclination is generally one which will permit a transverse tilting motion of the nozzle stem member 94 (which motion occurs during opening and closing of the valve 70) to be converted into vertical movement of moveable cup member 92 with the position of the cup member being predictably determined by the position of the stem member 94 at any given time. The conical face 107f of camming member 107 cooperates with the flange face 96f of flange 96 to achieve a capability for maximum movement of the cup member 92 during a valve opening operation for a minimum angle of deflection or tilting for the nozzle stem member 94 during a valve opening operation. Thus, the location and configuration of the camming member 107 can be varied as desired. The clearance between the apertures 104 and the sleeve 103 is not required in any given embodiment of a valve structure 70, but is desirable, it is now believed, in order to achieve a minimum flow pathway and a maximum aperture of valve opening during a valve dispensing operation for a valve structure 70. Observe that these advantages and features are achieved without any movement of container fill axially through the interior of the moveable cup member 92. The actual flow pathway of fluid being dispensed thus takes place primarily in a transverse (radial) direction and not in an axial direction relative to the moveable cup member 92 in a valve structure 70. The camming member 107 thus increases the valve aperture in a surprising and very effective manner.

Referring to FIG. 5, there is seen an alternative valve structure of the present invention which is herein designated in its entirety by the numeral 70'. Components of the valve structure 70' are similarly numbered with respect to the components incorporated into the tiltable valve structure 70 but with the addition of prime marks thereto for convenience and ready understanding.

The moveable cup member 92' is here provided with a skirt 108 which is directly integrally interconnected with the circumferentially outer portions of the plate 99' and no intervening sleeve (analogous to the sleeve 103 of moveable cup member 92) is here provided.

In place of the conically tapered camming member 107 of valve 70, there is here employed a hemispherically tapered camming member 107'.

In place of the coiled compression spring 106, there is here provided a molded plastic compression spring 110 which is nestibly received at one end thereof in the interior portion of the moveable cup member 92' and at its base portion 111, is provided with a flattened face 111 that makes interfacial contact with interior surface portions of the interior bottom surface of the cup 85'.

A multiplicity of structural variations are possible for a valve structure of the present invention as those skilled in the art will appreciate so that no undue limitations are to be inferred or assumed from the preceding illustrative exemplary embodiments.

I claim:

1. A fluid dispensing valve structure for dispensing the viscous contents of a pressurized container comprising:

a valve mounting cup peripherally sealingly securable to said pressurized container and having wall portions defining an interior valve receiving chamber with a central upper aperture defined therein;

a resilient seal member positioned around and radially adjacent said aperture in said valve receiving chamber;

an elongated tubular nozzle means having a dispensing orifice in one end thereof and having a second opposed and radially outwardly flanged end extending through said central aperture and yieldingly sealingly supported by said resilient seal member in a normally generally straight upright extended position relative to said valve mounting cup;

a moveable valve cup means reciprocally longitudinally slidably carried within said valve receiving chamber and normally biasable against said resilient seal member to form a seal means for normally sealing the contents of said container, said moveable valve cup member being engageable with said second end;

said contents of said pressurized container being dispensable when said one end is tiltably displaced relative to said generally straight upright extended position by an external deflecting operating force applied thereagainst, thereby opening said seal means;

said moveable valve cup member including:
  (A) a valve plate portion position to extend across said second end having perimeter regions,
  (B) annular rib means upstanding from valve plate portion for engaging said resilient seal member peripherally of said second end, and
  (C) sidewall means for slidably guiding said moveable valve cup member relative to said wall portions in said valve receiving chamber during said reciprocal sliding movements;

aperture means defined in said side wall portions generally axially adjacent said resilient seal member and generally radially adjacent said second end for passage of said viscous contents therethrough to said second end in a generally radial direction relative to said wall portions;

the interrelationship between said moveable valve cup means, said tubular nozzle means, said resilient seal member, and said mounting cup member being such that a substantially unobstructed flow of said contents through said valve structure and across said base portion occurs when said one end is so tiltably displaced.

2. The valve structure of claim 1 so secured to said pressurized container and wherein said pressurized contents provide yielding biasing means urging formation of said seal means.

3. The valve structure of claim 1 additionally including retaining means which limits extent of such slidability of said moveable valve cup member relative to said mounting cup member away from said resilient seal member.

4. The valve structure of claim 3 additionally including spring means urging formation of said seal means, said spring means extending between said retaining means and said moveable cup member.

5. The valve structure of claim 1 further including camming means centrally upstanding from said base portion and slidably engageable with portions of said second end when said one end is so tiltably displaced, whereby deflection of said moveable valve cup member occurs when said second end slides therealong.

6. The valve structure of claim 5, wherein said camming means is conically shaped.

7. The valve structure of claim 5, wherein said camming means is hemispherically shaped.

8. A device for dispensing a highly viscous liquid comprising:
  (A) a pressurizable container,
  (B) a fluid dispensing valve structure secured to said container and having fluid communication with the interior thereof, said valve structure being as described in claim 1.

9. A fluid dispensing valve structure for dispensing the viscous contents of a pressurized container comprising:
  a mounting cup member peripherally sealingly securable to said pressurized container and having wall portions defining an interior valve receiving chamber with a central upper mouth defined therein;
  means for so sealingly securing said member to said pressurized container;
  a resilient seal member positioned about said mouth and having a central aperture defined therein;
  said mounting cup member further including a plate means extending about said mouth for retaining said resilient seal member and including securing means therefor mounting said plate means to said mounting cup member, and further including a central opening defined therein;
  an elongated tubular nozzle means having a dispensing orifice in one end thereof and having a second opposed and outwardly flanged end extending through said mouth and said aperture and sealingly supported in said plate means by said resilient seal member in a normally generally straight upright extended position relative to said valve mounting cup;
  a moveable valve cup means reciprocally longitudinally slidably moveable within said valve receiving chamber along said wall portions and normally biasable against said resilient seal member to form a seal means for normally sealing the contents of said container, said moveable valve cup member being engageable with said second end;
  said contents of said pressurized container being dispensable through said valve structure when said one end is tiltably displaced relative to said generally straight upright extended position by an external deflecting operating force applied thereagainst, thereby opening said seal means;
  said moveable valve cup member including:
    (A) a valve plate portion extending across said second end of said tubular nozzle means,
    (B) annular rib means upstanding from said valve plate portion for engaging said resilient seal member peripherally of said second end, and
    (C) sidewall means for slidably guiding said moveable valve cup member relative to said wall portions during said reciprocal sliding movements;
  aperture means defined in said side wall portions generally axially adjacent said resilient seal member and generally radially adjacent said second end for passage of said viscous contents therethrough to said second end in a generally radial and transverse direction relative to said wall portions;
  the interrelationship between said moveable valve cup member, said plate means, said tubular nozzle means, said resilient seal member, and said mounting cup member being such that a substantially unobstructed flow of said contents through said valve structure across said base portion occurs when said one end is so tiltably displaced.

10. The valve structure of claim 9 further including camming means centrally upstanding from said base portion and slidably engageable with portions of said second end means when said one end is so tiltably displaced, whereby deflection of said moveable valve cup member occurs when said second end slides therealong.

* * * * *